Dec. 27, 1966 A. L. HUBBARD 3,294,371
COTTON PICKER WITH VIBRATING HOPPER
Filed Oct. 6, 1964 2 Sheets-Sheet 1

INVENTOR.
A.L. HUBBARD
BY William A. Murray
ATTORNEY

Dec. 27, 1966   A. L. HUBBARD   3,294,371
COTTON PICKER WITH VIBRATING HOPPER
Filed Oct. 6, 1964   2 Sheets-Sheet 2

INVENTOR.
A.L. HUBBARD

BY William A. Murray
ATTORNEY

United States Patent Office 3,294,371
Patented Dec. 27, 1966

3,294,371
COTTON PICKER WITH VIBRATING HOPPER
Arthur L. Hubbard, Des Moines, Iowa, assignor to Deere & Company, Moline, Ill., a corporation of Delaware
Filed Oct. 6, 1964, Ser. No. 401,923
4 Claims. (Cl. 259—29)

This invention relates to a cotton harvester. More particularly the invention relates to the basket or container receiving the cotton from the cotton harvester. Still more particularly, this invention relates to a vibrating mechanism associated with the basket causing the cotton to compact in the container.

It is the primary object of the present invention to incorporate between the main frame of the harvester and the harvester basket or container vibrating mechanism moving the basket generally in a vertical vibratory action, so as to cause the cotton received from the harvesting mechanisms to compact into the base of the container. The nature of the cotton when it is harvested from the field is both dry and fluffy. The fibers of the cotton bolls are such that they will tend to snag onto various portions of the container and to fibers of other cotton bolls. The weight of the cotton boll in most instances is light and consequently considerable bridging between bolls occurs causing the container to appear full whereas in effect, if compressed, considerably more cotton could be added to the container.

It is, therefore, the purpose of the present invention to provide structure vibrating the container to breakup the bridging characteristics of the cotton bolls and cause the cotton bolls to compact into the base of the container. By sufficient vibration, the capacity of the basket or container may be materially increased.

Specifically it is an object of the present invention to provide cams and cam followers on the main frame of the harvester and the framework for the basket operating to effect the vibration of the basket relative to the main frame. As a more specific feature of the invention, it is proposed to provide a fluid connection between the hydraulic return line that normally operates to replace the basket from a tilted or discharging position to its normal operating position and an hydraulic motor operating the cam member. The sequence of operation of a basket of this arrangement is to first move the basket into its normal operating position. Then by use of the same valve which moves the basket into this position, the vibratory cam action may occur. Consequently, the unique arrangement of hydraulic systems, which will become clearer following the present disclosure, permits the conventional hydraulic system to be used and the entire structure causing the vibratory action to be installed as an attachment to the basket and to the cotton picker.

Other objects and advantages of the present invention will become apparent to those skilled in the art as the nature of the invention is better understood from the following description and as shown in the accompanying drawings.

Figure 1:
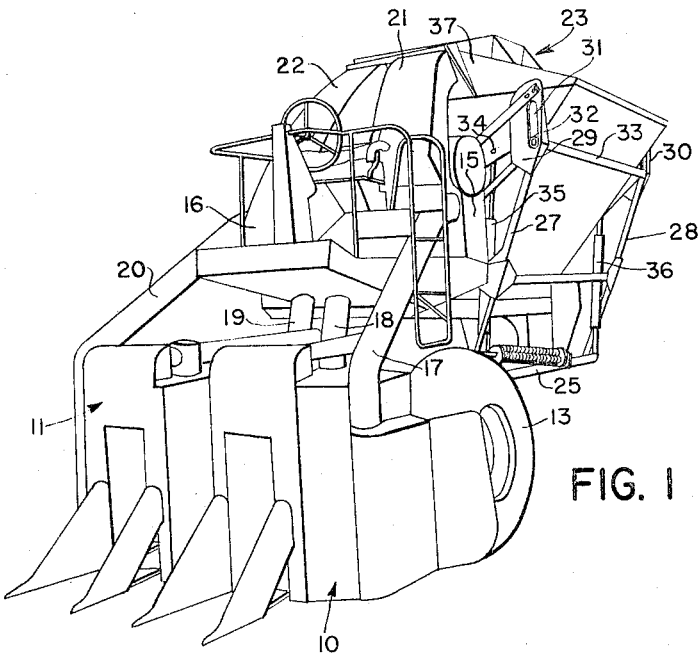
FIG. 1 is a perspective view of a cotton harvester utilizing the principles of the present invention.
Figure 2:
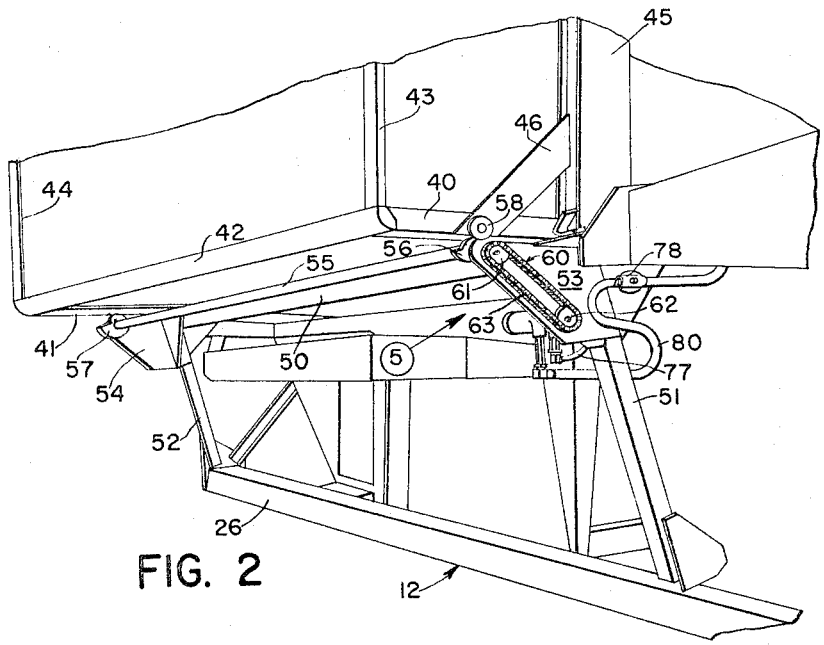
FIG. 2 is a front and side perspective view of a portion of a cotton harvester basket or container and a portion of the main frame of the harvester.

A harvesting unit, as shown in FIG. 1, generally includes a pair of row harvesting assemblies 10, 11 adapted to harvest an adjacent pair of rows of plants as the harvester advances. The units 10, 11 are supported on the forward end of the main frame 12 including a tractor body, not shown, and a pair of rear transversely spaced traction wheels, one being indicated at 13. The forward end of the frame structure 12 is supported on a front steerable wheel, not shown. The harvesting assemblies 10, 11 include as part thereof a pair of suction fans, indicated generally by their locations 15, 16 receiving the picked cotton by cotton duct work 17, 18 and 19, 20 respectively. Basket ductwork 21, 22 receives the cotton discharged from the fans 15, 16 respectively and directs it into an awaiting container or basket 23.

The main frame 12 includes a pair of longitudinally extending side beams 25, 26 having front and rear ends terminating adjacent the front and rear ends of the basket 23. On the left side of the cotton harvester, additional front and rear frameworks 27, 28 extend upwardly and outwardly to apex portions defined by front and rear upright plates 29, 30 adjacent the front and rear ends of the basket and having elongated upright slots, such as shown at 31, that receive rollers, such as shown at 32, on the respective ends of the baskets. The slots 31 normally serve the purpose of permitting vertical movement of the basket in its entirety and horizontal tilting of the basket 23 for purposes of discharge. Extending between the rollers 32 is a fore-and-aft extending rod 33 affixed to the basket 23. Hydraulic motors 35, 36 are connected at their upper ends to the front and rear walls of the picker basket 23 and upon extension and retraction thereof the shaft 33 and rollers 32 at opposite ends of the shaft 33 first rise in the slots 31, and then pivot to tilt the basket. A basket lid 37 is provided at the top of the basket and automatically opens upon the basket moving into a position of dumping or tilting for discharging the cotton bolls. The exact method of raising the lid 37 is not important for purposes of the present invention. The basket 23 includes angle iron framework positioned around the basket and effecting rigidity to the basket. The basket panels are generally perforated as is conventional. Among the framework on the basket proper are front and rear transverse horizontal beam members 40, 41 defining the lower front and rear edges of the basket. The outer ends of the frame members 40, 41 are interconnected by a longitudinally extending beam 42. Corner upright angle members 43, 44 extend from the junctures between the transverse beams 40, 41 and the longitudinal beams 42. Adjacent the transverse center of the basket is a pair of vertical upright beam members 45. Gusset plates at 46 interconnect the lower beams 40, 41 and their respective upright beams 45.

The main frame 12 further includes an upper longitudinally extending beam 50 underlying the basket beneath the transverse beams 40, 41 and offers support for the basket. Longitudinally spaced framework 51, 52 extends upwardly from the main beam 12 to the beam 50 and carries fore-and-aft spaced apart transversely disposed upright plate members 53, 54. Opposite ends of a longitudinally extending shaft 55 are journaled in the plates 53, 54. Opposite ends of the shaft 55 carry rotary cam members 56, 57 engageable with the undersides of cam followers 58 on the transverse beams 40, 41 and operate upon rotation to create a vertical vibratory motion to the basket 23. The cams 56, 57 are fixed to rotate with the shaft 55. The shaft 55 is driven through a chain drive 60 including a sprocket 61 fixed to the extreme forward end of the shaft 55, a sprocket 62, and a chain 63. The sprocket 62 is driven by a rotary hydraulic motor 64, of conventional nature, and affixed to the inner surface of the plate 53. The main shaft 65 of the motor 64 is journaled in the plate 53 and has the sprocket 62 affixed thereto.

Figure 3:
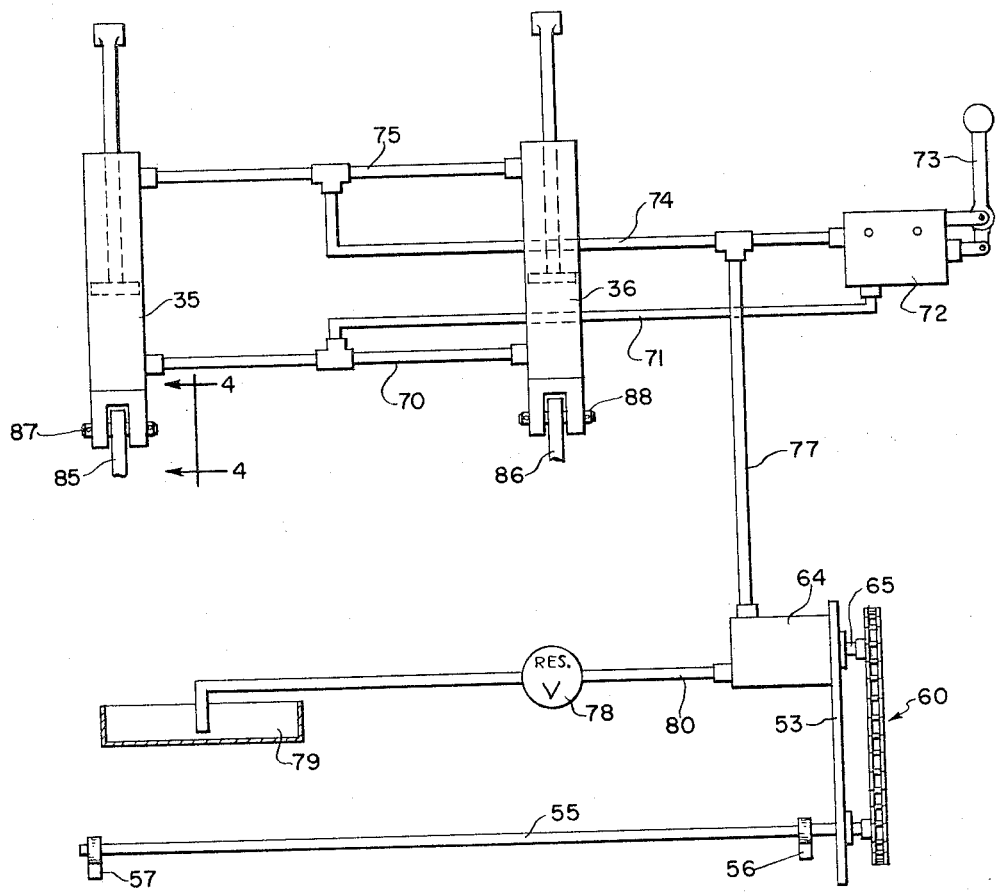
FIG. 3 is a schematic view of the hydraulic system utilized in tilting and returning the basket from and to the discharge position and the normal operating position, and the system for operating the vibrating mechanism of the present invention.

Referring now to FIG. 3 for details of the hydraulic system operating the hydraulic motors 35, 36 and the hydraulic motor 64, it is in order to review the operation of the cylinders 35, 36. The basket 23 normally rotates about the axis of the shaft 33. The cylinders 35, 36 are caused to extend by fluid passing through an input line 70 common to both units 35, 36 and in communication with a fluid line 71, in turn controlled through a conventional type hydraulic valve 72, a hydraulic manual control 73 being provided to move material into the line 71. Extension of the cylinders 35, 36 causes the basket 23 to move clockwise as viewed in FIG. 1 and to cause the cotton contained in the basket to be discharged out one side of the basket. To move the basket to its normal operating position, which is the position shown in FIG. 1, from its discharge position, the fluid flow is reversed and fluid under pressure is moved into a fluid return line 74 by suitable manipulation of the manual control lever 73 and into a common line 75 communicating with the return ends of the cylinders 35, 36. Consequently, the basket is forcibly moved to its normal operating position by the fluid under pressure in line 74.

A rotary type hydraulic motor 64 receives fluid from the return line 74 via line 77. Downstream from the motor 64 is a restricter valve 78 for maintaining pressure in the lines 74, 75 and 77 prior to the fluid being moved into a reservoir 79 by a line 80.

In operation the above described hydraulic system has considerable advantage. In moving the basket 23 into its normal operating position, the basket is moved until it contacts the upper surface of the longitudinal beam 50. At this point, if the hydraulic motor 64 were not present, the fluid would then move through the restricter valve 78 and into the reservoir. However, when it is desired to have the hydraulic rotary motor 64 in operation, the same lever 73 may be utilized to operate the motor 64 by moving the lever to the basket return position. Since the basket, in normal operation, is in normal operating position, fluid will move into the motor 64 prior to passing through the restricter valve 68. This will, of course, cause the motor 64 to operate and the cams 56, 57 to vibrate the basket 23.

Figure 4:
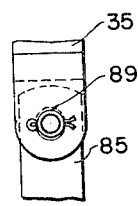
FIG. 4 is a side view showing a portion of the hydraulic system as taken along the line 4—4 of FIG. 3.
Figure 5:
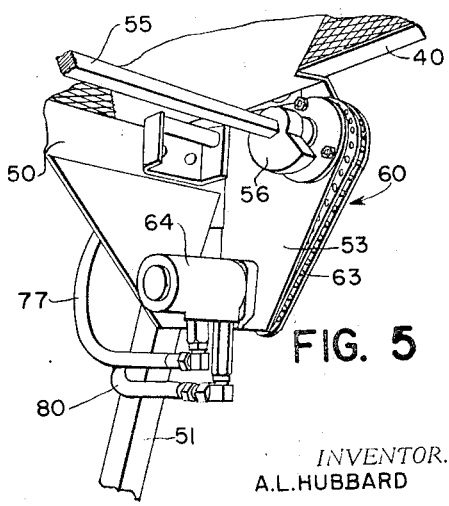
FIG. 5 is a perspective view taken from the position indicated at 5 in FIG. 2.

Reviewing FIG. 1, it will be noted that the pivot location for supporting the basket 23 is substantially on the shaft 33. The hydraulic cylinders 35, 36 are offset from the pivot shaft 33 and are relatively close and particularly as compared to the position of the cam followers 56, 57. Consequently, in order not to operate against the force of the cylinders 35, 36 and to thereby dampen the vibration, provision is made in the hydraulic cylinders 35, 36 to permit vibration of the basket 23. The cylinders 35, 36 are supported upon frame brackets 85, 86 by pivot pins 87, 88. The brackets 85, 86 are provided with elongated slots, such as indicated at 89, FIG. 4. Consequently, the vibration occurring through action of the cams 56, 57 is permitted by the loose fitting arrangement of the pins 87, 88 in respect to their fitting in the brackets 85, 86.

While only one form of the invention has been shown, it should be recognized that other forms and variations will occur to those skilled in the art. Therefore, while the preferred form has been shown and described in concise and detailed manner for the purpose of completely illustrating the principles of this invention, it should be understood there is no intention to limit or narrow the invention beyond the broad concepts set forth in the appended claims.

What is claimed is:

1. In a cotton receiving container for use with a cotton harvester having a main frame, the container having a framework adapted for suspension on the main frame and supported thereon by horizontal pivot means permitting the container to swing vertically away from a normal operating position, the improvement residing in: extensible and retractable hydraulic motor means extending between the container and main frame adapted to tilt the container on the pivot means and including a pressurized fluid return line for returning the container to a normal operating position; vibrating structure between the main frame and framework including rotatable cams and cam followers on the frame and framework for effecting vertical vibratory motion of the container relative to the main frame, and a rotary hydraulic motor means drivingly connected to the cams for effecting rotation of the latter; and a pressurized fluid source extending from the return line to the rotary motor means for operating the latter.

2. On a cotton harvester having a main frame, a cotton receiving container having a framework adapted for suspension on the main frame and supported thereon by means permitting the container to move between a normal operating position and a discharge position; hydraulic motor means between the container and main frame adapted to move the container between the aforesaid positions and including a pressurized fluid return line for returning the container to the normal operating position; vibrating structure between the main frame and framework for effecting vibratory motion of the container relative to the main frame; hydraulic motor means drivingly connected to the vibrating structure for effecting vibration of the container; and a pressurized fluid source extending from the return line to the motor means connected to the vibrating structure for operating the latter.

3. In the combination of a cotton harvester having a main frame and a cotton receiving container having opposite ends and adapted for suspension on the main frame and supported thereon by horizontal pivot means permitting the container to swing vertically, and extensible and retractable hydraulic motor means extending between the container and main frame adapted to tilt the container on the pivot and including a pressurized fluid return line for returning the container to a normal operating position, the improvement comprising: rotatable cam means between the main frame and opposite ends of the container for effecting vertical vibratory motion for the container relative to the main frame; a rotary hydraulic motor means drivingly connected to the cam means for effecting rotation of a latter; and a pressurized fluid source extending from the return line to the rotary motor means for operating the latter.

4. In the combination of a cotton harvester having a main frame and a cotton receiving container having opposite ends and adapted for suspension on the main frame and supported thereon by horizontal pivot means permitting the container to swing vertically, and extensible and retractable hydraulic motor means extending between the container and main frame adapted to tilt the container on the pivot and including a pressurized fluid return line for returning the container to a normal operating position, the improvement comprising: cam members between the main frame and opposite ends of the container for effecting vertical vibratory motion of the container relative to the main frame, and hydraulic motor means operatively connected to the cam members for effecting vibration of the container; and a pressurized fluid source extending from the return line to the motor means connected to the cam members for operating the latter.

References Cited by the Examiner

UNITED STATES PATENTS

| | | | |
|---|---|---|---|
| 991,381 | 5/1911 | Simmers | 259—72 |
| 2,399,718 | 5/1946 | Baker. | |
| 2,497,532 | 2/1950 | Berkman | 259—72 X |
| 2,719,394 | 10/1955 | Thomann. | |
| 2,795,990 | 6/1957 | Bohlman | 141—74 X |
| 2,947,571 | 8/1960 | Hagen | 298—17 X |
| 3,173,664 | 3/1965 | Isaacson | 68—210 X |
| 3,215,291 | 11/1965 | Nickla | 214—83 |

BENJAMIN HERSH, *Primary Examiner.*

R. J. JOHNSON, *Assistant Examiner.*